United States Patent
Minium et al.

(10) Patent No.: US 8,191,115 B2
(45) Date of Patent: May 29, 2012

(54) METHOD AND APPARATUS FOR EXTENSIBLE SECURITY AUTHORIZATION GROUPING

(75) Inventors: Dennis W. Minium, Sammamish, WA (US); Bulat Y. Shelepov, Mercer Island, WA (US); Xiongjian Fu, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1282 days.

(21) Appl. No.: 11/032,527

(22) Filed: Jan. 10, 2005

(65) Prior Publication Data

US 2006/0156384 A1     Jul. 13, 2006

(51) Int. Cl.
  *G06F 7/04*     (2006.01)
  *G06F 17/30*    (2006.01)
  *H04L 29/06*    (2006.01)
(52) U.S. Cl. ............... 726/4; 726/2; 726/21; 713/165; 713/167; 707/999.009
(58) Field of Classification Search .............. 726/4
  See application file for complete search history.

(56) References Cited

U.S. PATENT DOCUMENTS

| | | | | |
|---|---|---|---|---|
| 5,720,033 A * | 2/1998 | Deo | ................. | 726/2 |
| 6,029,195 A * | 2/2000 | Herz | ................. | 725/116 |
| 6,038,563 A * | 3/2000 | Bapat et al. | ................. | 707/10 |
| 6,085,191 A * | 7/2000 | Fisher et al. | ................. | 707/737 |
| 6,112,181 A * | 8/2000 | Shear et al. | ................. | 705/7.29 |
| 6,236,996 B1 * | 5/2001 | Bapat et al. | ................. | 707/999.009 |
| 6,326,996 B1 * | 12/2001 | Brabander | ................. | 348/189 |
| 6,327,628 B1 * | 12/2001 | Anuff et al. | ................. | 719/311 |
| 6,389,540 B1 * | 5/2002 | Scheifler et al. | ................. | 726/21 |
| 6,678,828 B1 * | 1/2004 | Pham et al. | ................. | 726/2 |
| 7,028,009 B2 * | 4/2006 | Wang et al. | ................. | 705/51 |
| 7,134,137 B2 * | 11/2006 | Joshi et al. | ................. | 726/1 |
| 7,171,411 B1 * | 1/2007 | Lewis et al. | ................. | 707/999.009 |
| 7,188,251 B1 * | 3/2007 | Slaughter et al. | ................. | 713/182 |
| 7,631,084 B2 * | 12/2009 | Thomas et al. | ................. | 709/227 |

OTHER PUBLICATIONS

Hailpern, Brent. Ossher, Harold. Extending Objects to Support Multiple Interfaces and Access Control. IEEE Transactions on Software Engineering. vol. 16, Issue: 11. Pub. Date: Nov. 1990. Current Version: Aug. 2002. Relevant pp. 1247-1257. Found on the World Wide Web at: http://ieeexplore.ieee.org/stamp/stamp.jsp?tp=&arnumber=60313.*

* cited by examiner

*Primary Examiner* — Nathan Flynn
*Assistant Examiner* — Jeremiah Avery

(57) ABSTRACT

A method and apparatus for providing an extensible grouping mechanism for security applications for use in a computer system. Groups may be established and maintained by non-system administrators and used to control actions that are taken with respect to objects, such as files and other resources. The groups and associated security functions may be implemented across a plurality of different software products and optionally integrated into an existing security mechanism maintained by system administrators. Software products used in the system may be arranged to request authorization to perform requested actions with respect to objects access to which is not controlled by a systems administrator.

18 Claims, 4 Drawing Sheets

Securable Object Class (SOC)

- Object Type / Name

- Actions Performable

FIG. 3

Authorization Entry (ACE)

- Object Identifier

- Group(s) / User(s) Action Authorization

FIG. 4

METHOD AND APPARATUS FOR EXTENSIBLE SECURITY AUTHORIZATION GROUPING

BACKGROUND OF INVENTION

1. Field of Invention

This invention relates to methods and apparatus for implementing an extensible grouping mechanism for security authorization, e.g., for use in computer systems.

2. Related Art

In the administration of computer systems, it is often desirable to organize users into one or more groups so that privileges may be given to groups of users via the group structure, rather than individually. For example, a system administrator may confer a first set of privileges to members of a first group, a second set of privileges to a second group, and so on. In one specific example, a system administrator may allow members of a first group to have full access to a set of files, while members of a second group have read-only access to those files, and a third group may have no access privileges to the files. Such a group structure can allow for more efficient management of privileges, e.g., when an individual user changes status in an organization and therefore is entitled to a different set of privileges, when privileges for a particular group change, or when additional files or other objects are created or otherwise newly introduced to the system. In these cases, the group structure can provide a convenient mechanism by which user privileges or other security features can be readily established or modified.

Security grouping arrangements are typically managed by one or more systems administrators of the computer system to reduce the likelihood of security breaches that may occur, for example, if a wide population of users were allowed to adjust group members, privileges assigned to various groups, etc. The result of such centralized control, however, is that many software products in the system cannot benefit from the system administrator-controlled grouping arrangement. That is, many software products in the system may access or otherwise use files or other objects whose access is not controlled by a system administrator, e.g., because the importance of such files is not sufficiently high to warrant the attention of a system administrator. As a result, these software products are provided with no means by which to control actions that are performed with respect to the objects by various users in the system.

SUMMARY OF INVENTION

Some individual software products include their own user group management facilities to handle user permissions that are unique to that particular software program. However, the inventors have appreciated at least one drawback to such arrangements is that these groups only have meaning in one particular software product. In addition, this solution may lead to a wide proliferation of groups in the system, with different group sets and privileges for each particular software program. This may lead to user confusion since groups with identical or similar sounding titles for different software programs may actually include different users, and may result in users avoiding any use of group security structures.

Aspects of the invention provide an extensible grouping mechanism that can be shared by any number of software products in a computer system. As a result, new software products, users, and/or files or other objects may be added to the system, and security privileges may be relatively easily adjusted to accommodate the changed conditions. This is because the grouping mechanism may establish one or more user groups that are shared by a plurality of software products in the system. Thus, each of a plurality of software products may be arranged to work with the grouping mechanism to identify whether a particular user is authorized to perform a requested action with respect to an identified object.

For example, multiple software products may request a grouping mechanism to provide an indication whether a user is authorized to perform a particular action. The grouping mechanism may identify one or more groups with which the user is associated, along with privileges assigned to the group or groups. Using this information, a determination may be made whether a user is associated with a group that is authorized to perform the requested action with respect to an identified object. Since the group structure may be shared by a plurality of software products, user groups may be implemented broadly across the system, reducing group maintenance overhead and providing users with a less complicated grouping structure within which to work.

In one aspect of the invention, the grouping mechanism may be applied to the security of files or other objects whose access is not controlled by a system administrator. Thus, the establishment and maintenance of groups in a grouping mechanism may be controlled by a non-system administrator, e.g., a user with less than system administrator-level privileges may establish and maintain groups in the grouping mechanism. By shifting the burden for controlling the makeup of groups away from system administrator-level individuals, a grouping mechanism in accordance with aspects of the invention may be more readily and widely used in the system.

In addition, a non-system administrator user may establish authorization for groups to perform actions with respect to objects in the system. Thus, a user with less than system administrator-level privileges may establish the permission information that identifies which groups and/or users are permitted to perform which actions with respect certain files or other objects. Accordingly, a grouping mechanism for controlling the security of objects in a system may be established and controlled outside of the purview of system administrators and may be applied across a wide variety of different software products.

In one aspect of the invention, limited scope groups within a grouping mechanism may be defined to include not only individual users or other limited scope groups, but also groups that are controlled by system administrators, e.g., operating system groups or directory groups. Thus, the grouping mechanism may take advantage of existing group structures created and maintained by system administrators. This feature may provide a more transparent grouping mechanism for users in the system. For example, in situations where access to a particular set of objects is intended to mirror access privileges for a user group defined by a system administrator, a limited scope group may be defined to include the particular system administrator-defined group. Thus, if changes are made to the membership of the system administrator-defined group, the membership in the corresponding limited scope group is likewise automatically changed.

In another aspect of the invention, permission information used to determine whether a user is authorized to perform an action with respect to an identified object for a plurality of different software products may be stored in a common location in the computer system. This common store of permission information may be periodically updated, and allow for faster identification of one or more groups to which a user is associated and/or determination that a user is authorized to perform a requested action. In one aspect of the invention, software products may themselves provide permission information, such as object types that are operated on by the software product and a complete list of actions that the software product can perform with respect to each object type. This may relieve the burden on a user that would otherwise be required to provide this information to the grouping mechanism. This feature may be particularly helpful when new software products are added to the system since portions of permission information needed to administer group security functions may be automatically or otherwise provided from the software without requiring input from a user.

In one aspect of the invention, an apparatus is provided for use in a computer system that includes a plurality of users and a plurality of software products, each for performing at least one action with respect to an object. The apparatus may include a group service having a store of groups, where each group includes at least one of the plurality of users. An authorization service in the apparatus may determine, based on permission information, permission for one of the plurality of users to perform a first action using a first software product with respect to a first object. The authorization service may also determine permission for one of the plurality of users to perform a second action using a second software product with respect to a second object. The permission information may indicate authorization for at least one group or user to perform at least one action with respect to an object for the plurality of software products, where access to the first and second objects is unrestricted by a systems administrator.

In one aspect of the invention, an apparatus is provided for use in a computer system that includes a plurality of users and a plurality of software products, each for performing at least one action with respect to an object. The apparatus may include a group service having a store of groups, where each group includes at least one of the plurality of users. An authorization service may determine permission for at least one user to perform an action with respect to an object based on permission information, where the permission information indicates at least one action that may be performed with respect to an object by at least one group or user. At least one non-system administrator may define at least some of the permission information to assign authorization to one or more groups or users to perform a first action with respect to a first object using a first software product, and may assign authorization to one or more groups or users to perform a second action with respect to a second object using second software product.

In another aspect of the invention, a method for operating a computer system includes receiving a first request regarding a first action requested to be performed by a first user with respect to a first object using a first software product, where access to the first object is unrestricted by permissions established by a systems administrator. Authorization for the first user to perform the first action using the first software product may be determined based on at least one group that the first user is associated with and permission information defining authorization for at least one group to perform at least one action with respect to at least one object. A second request may be received regarding a second action requested to be performed by a second user with respect to a second object using a second software product, where access to the second object is unrestricted by permissions established by a systems administrator. Authorization for the second user to perform the second action using the second software product may be determined based on at least one group that the second user is associated with and the permission information.

In another aspect of the invention, a computer readable medium may include instructions to cause a computer system to store a plurality of groups, each group including at least one user, and to provide an authorization service that determines, based on permission information, permission for a first user to perform a first action using a first software product with respect to a first object. The authorization service may also determine permission for a second user to perform a second action using a second software product with respect to a second object. The permission information may indicate authorization for at least one group or user to perform at least one action with respect to an object for a plurality of software products.

These and other aspects of the invention will be apparent and/or obvious from the following description.

BRIEF DESCRIPTION OF THE DRAWINGS

FIG. 3 shows securable object class (SOC) information in an illustrative embodiment;

FIG. 4 shows authorization entry (ACE) information in an illustrative embodiment.

DETAILED DESCRIPTION

Figure 1:
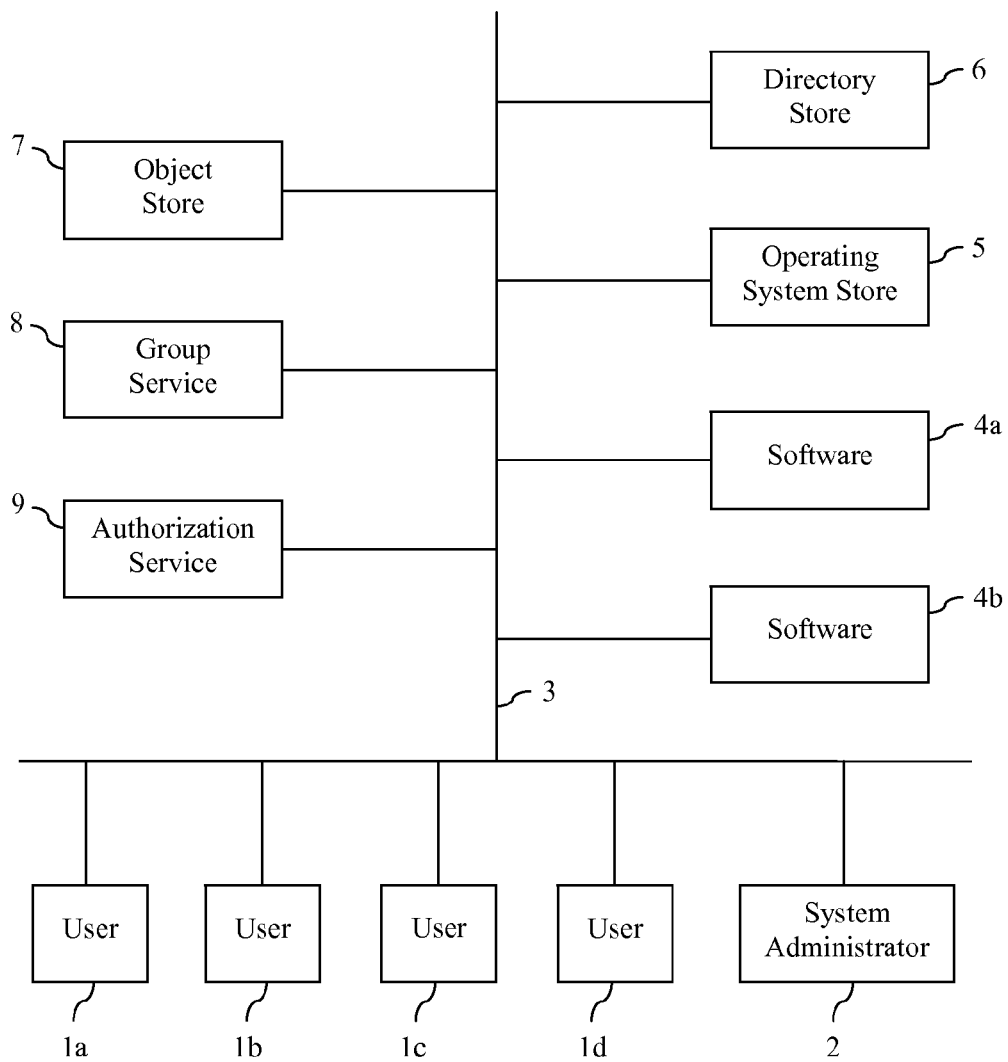
FIG. 1 is a schematic view of a portion of a computer system in accordance with one embodiment of the invention.

Aspects of the invention are described below with reference to illustrative embodiments. It should be understood that reference to these illustrative embodiments is not made to limit aspects of the invention in any way. Instead, illustrative embodiments are used to aid in the description and understanding of various aspects of the invention. Therefore, the following description is intended to be illustrative, not limiting.

In one aspect of the invention, a computer system is arranged so as to provide a security grouping mechanism for objects. The computer system may be arranged in any suitable way, and may include a plurality of users in a computer network. These users may use a plurality of different software products to perform actions with respect to objects. As used herein, an "object" is a file, signal, or other set of information with respect to which some action (such as accessing, modifying or otherwise using the information) may be performed. The system may include a group service that stores a plurality of groups, i.e., collections of users and/or other groups that together define a set of users. The groups may be established in any suitable way, e.g., to include collections of users from a particular business unit, users engaged in a particular project (such as software development), users with a particular security clearance, etc. An authorization service may also be provided that is arranged to determine if particular users are authorized to perform actions with respect to objects based on stored permission information. The permission information may indicate one or more actions that certain groups are authorized to perform with respect to objects or object types. The authorization service may be an independent portion of the system, or may be incorporated into one or more software products.

When users attempt to perform an action using a software product, the software product may send a request to the authorization service and group service to authorize the attempted action. The group service may identify or confirm the group (s) with which the user is associated. Based on this information, the authorization service may determine if the user belongs to a group that is authorized to perform the requested action, and send a suitable response to the software product. If the authorization service is incorporated into the software product, the software product may request the group service to identify or confirm the user's associated groups and perform the authorization step internally. Otherwise, the request for authorization to perform an action may be directed to the authorization service, which may confirm the user's group status with the group service and compare the user's associated groups to the stored permission information.

The group service and authorization service may be arranged to handle authorizations with respect to actions performed on objects whose access is not controlled by a system administrator. Thus, a non-system administrator may control the makeup of groups with the group service and control permission information used by the authorization service, allowing the grouping mechanism to operate autonomously of the system administrator. However, the groups used by the group service may be arranged to work with a group structure maintained by the system administrator. For example, groups in the group service may include system administrator-controlled groups and/or other groups or users. Thus, the grouping mechanism may take advantage of an existing group structure, if desired.

FIG. 1 shows a portion of an illustrative computer system 100 that incorporates aspects of the invention. In this illustrative embodiment, a plurality of users 1 may interface with the computer system 100 using any suitable device, such as a general purpose computer, personal digital assistant (PDA), telephone or other wireless device, a "dumb" terminal, or other device. The users 1 as well as other portions of the system 100 one may communicate via a communication network 3. The communication network 3 may include any suitable device or devices, such as a local area network, the Internet, a wireless communication network, hard wired connections, a telephone network, or any suitable combination of private and/or public networks or other systems. Communications may take place using any suitable protocol or protocols, communication interfaces, and so on, as the manner in which information is transmitted between various portions of the computer system 100 may be performed in any suitable way. For example, the communications network 3 may include two or more private networks that are arranged to interface with each other, e.g., via the Internet and suitable firewalls or other interfaces.

Various aspects of the system 100 may be controlled or otherwise influenced by a system administrator 2. The system administrator 2 may define certain security parameters for the system 100, such as defining one or more directory groups or operating system groups and the privileges that may be conferred upon each of the group members. As will be understood by those of skill in the art, a directory group may be a group of users defined in a directory that spans a network. Such directory groups may be maintained in a directory store 6, e.g., in a network server. Operating system groups may be maintained in an operating system store 5 and may include one or more users that are controlled by, and are specific to, the operating system on a particular machine. The operating system store 5 may include group information that is stored in multiple devices in the network, e.g., at each of the user 1 devices, and/or may include group information stored at a more centralized location, such as a network server. Like the directory store 6, the operating system store 5 need not include information stored in a single location, but rather may include information stored in multiple, physically separate locations.

The system administrator 2 may employ directory and/or operating system groups to control access rights or other privileges for users in the system 100. For example, the system administrator 2 may control user access rights to files or other objects in the system 100 based on directory and/or operating system groups to which users are associated. For example, the administrator 2 may establish a first directory group that has full access to a first set of files, while a second directory group of users is denied access to the same set of files. It should be understood, however, that although in this illustrative embodiment a system administrator 2 implements directory and/or operating systems groups to perform certain security functions, a computer system arranged in accordance with aspects of the invention need not include or use such system administrator-controlled groups or security functions.

In this illustrative embodiment, the system 100 is also arranged to maintain in a group service 8 a set of limited scope groups that may be conceptually considered to be a group layer over the top of the operating system and/or directory groups (hereafter OS/D groups) and users. Although such groups are referred to herein as "limited scope" groups, the groups may be used in any suitable way and are not limited in the type of functions in which the groups may be employed. Rather, the "limited scope" nature of these groups refers to the fact that these groups are not controlled at the system administrator level. Rather, these groups are controlled by users with less than system administrator privileges.

Limited scope groups may each include one or more limited scope groups, OS/D groups, and/or users, and may be maintained by a group service 8. The group service 8 may include one or more suitable interfaces (such as a graphical user interface, or GUI) by which a user, such as the user 1a, having less than system administrator privileges may establish, modify, delete or otherwise maintain limited scope groups. The group service 8 may be implemented by one or more software modules operating in any suitable portion or portions of the system 100, such as at a network server and/or a general purpose computer at the user 1 location. The group service 8 may also include stored information, such as information representative of limited scope groups and the users, OS/D groups or other entities associated with limited scope groups.

The system 100 may also include an authorization service 9 that uses permission information to determine whether requested actions to be performed by a user with respect to an object are authorized. The permission information used by the authorization service may indicate authorized actions that may be performed by a group or groups with respect to an object or object type. Typically, actions will be performed with respect to an object by a software product 4, and thus in one aspect of the invention software products 4 may be arranged to send a request to the authorization service 9 to confirm that an action is authorized. The authorization service 9 may use the limited scope groups in the group service 8 as part of determining whether a requested action is authorized. For example, the authorization service 9 may authorize a requested action to be performed by a user if the group service 8 indicates that the user is associated with a group that, according to permission information stored by the authorization service 9, is authorized to perform the requested action with respect to the identified object.

The authorization service 9 may include one or more interfaces by which a user with less than system administrator privileges may define permission information. For example, the authorization service 9 may present a graphical user interface to a user, such as the user 1a, and the user may define permission information including various groups that may perform specific actions with respect to specific objects or object types. Accordingly, the authorization service 9 may include one or more software modules that operate on any suitable device such as a network server and/or a machine local to the user 1. The authorization service 9 may also include stored permission information.

In one operative example, a first user 1a may request to perform a particular action with respect to a first object using a first software product 4a. The first object may be any suitable object and may reside in an object store 7, which may include one or more storage devices located at the user's local machine, a network server, or other storage device or location in the computer system 100. The software product 4a may send a request to the authorization service 9 for authorization to perform the requested action. The request may include the identity of the user, the requested action and the object with respect to which the action is to be performed. By interacting with the group service 8, the authorization service 9 may determine the group or groups with which the identified user is associated. For example, the authorization service 9 may request the group service 8 to identify all groups with which the user is associated, or the authorization service 9 may provide a list of groups and request that the group service identify those groups with which the user is associated. Using the groups identified or confirmed by the group service 8, the authorization service 9 may then determine whether members of the group or groups to which the user is associated are authorized to perform the requested action with respect to the identified object or object type. For example, stored permission information may indicate various groups that are permitted to perform particular actions with respect to specific objects or object types. If the user is associated with a group that is permitted to perform the requested action, the authorization service 9 may send a response to the software product 4a indicating that the action is authorized. Alternately, the authorization service 9 may deny the requested action.

At the same time, another user, such as user 1b, may request permission to perform a particular action with respect to a specific object using a second software product 4b. In response, the software product 4b may provide a request to the authorization service 9 to see if the requested action is authorized. As in the case above, the authorization service 9 may identify the group or groups to which the second user is associated, and determine whether any of those groups is permitted to perform the requested action.

One feature of this aspect of the invention is that the security grouping mechanism is highly extensible. That is, additional users, software products and/or objects may be added to the system 100, and full advantage of the established group architecture may be taken. For example, a third software product may be added to the system 100 and configured to control the actions of users with respect to certain objects using established limited scope groups. Further, permissions information specific to the third software product may be provided to the authorization service 9 without requiring assistance from the system administrator 2. Moreover, if the integration of the third software product requires some modification of the limited scope groups, new limited scope groups may be added or existing limited scope groups may be modified, again without requiring system administrator intervention.

Figure 2:
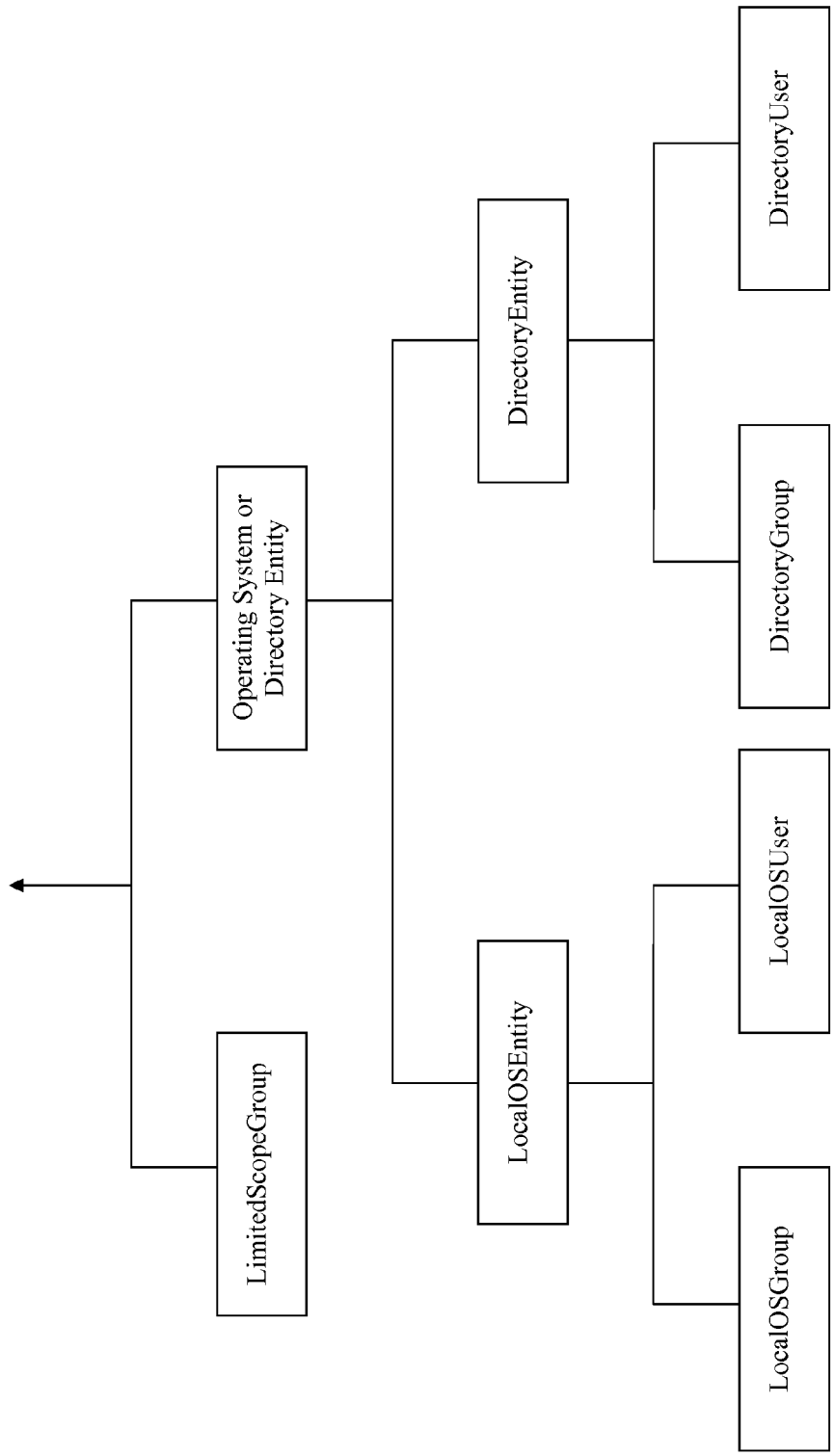
FIG. 2 shows a user and group hierarchy in one illustrative embodiment.

Limited scope groups may be structured in any suitable way and may, or may not, interact with other established groups (e.g., OS/D groups) in a computer system 100. FIG. 2 shows a schematic diagram of a group hierarchy used in the illustrative embodiment of FIG. 1. However, it should be understood that the group hierarchy used in aspects of the invention may be arranged in other suitable ways. In this illustrative embodiment, each user 1 includes a local computer that implements an operating system. Each user 1 may have a local operating system group (LocalOSGroup) and a local operating system user (LocalOSUser). Both of these entities are local operating system entities and have relevance to the particular machine on which they are implemented. The system 100 may also use directory groups (DirectoryGroup) and directory users (DirectoryUser) that are groups and users, respectively, defined in a directory that spans a network. In this embodiment, a LocalOSGroup can include one or more LocalOSUsers, DirectoryGroups or DirectoryUsers. A DirectoryGroup may include one or more DirectoryGroups or DirectoryUsers. Collectively, these entities are referred to as Operating System or Directory entities, and are under the control of a system administrator. As discussed above, limited scope groups may include one or more limited scope groups, one or more OS/D groups (LocalOSGroups or DirectoryGroups), one or more LocalOSUsers or one or more DirectoryUsers.

In this illustrative embodiment, the authorization service 9 stores permission information that includes securable object class (SOC), object registration and authorization entry (ACE) information. SOC information, as shown in FIG. 3, includes an object type or name and the one or more actions that are performable with respect to the object type or name. Thus, SOC information may be stored in the authorization service 9 for each software product 4 and detail the object types or names that are used by the software product 4 as well as the corresponding actions that are performable by the software product 4 with respect to the object type or name. For example, one set of SOC information for the object type/name FILE may have the following corresponding actions: MANAGE_PERMISSIONS, READ, WRITE and APPEND. Thus, for any object of the type FILE, the actions MANAGE PERMISSIONS, READ, WRITE and APPEND may be performed.

Objects may also be registered with the authorization service 9, e.g., when they are created or at some time thereafter. The registration information may include an object identifier and an object type or name. Based on the registration and SOC information, the authorization service 9 can determine a complete list of performable actions for any registered object. Of course, this information may be stored in other ways, e.g., object registration records may include the object identifier, object type and a complete list of performable actions. However, by splitting this information as described above, storage space required may be reduced. Also, objects can be made relatively easily subject, or not subject, to the grouping mechanism by registering, or unregistering, the object with the authorization service 9, e.g., via a user interacting with a GUI provided by the authorization service 9.

ACE information, as shown in FIG. 4, may indicate an object identifier and a set of group(s) and/or user(s) along with the actions they have authorization to perform, or not perform. Accordingly, when the authorization service 9 receives an action request from a software product 4, the authorization service 9 may identify the group(s) included in ACE information for the identified object, identify which, if any, of those groups the identified user is associated with, and determine if the user is permitted to perform the requested action.

In one aspect of the invention, permission information used by the authorization service 9 to verify authorization for action requests for a plurality of software products 4 may be stored together in a common cache. Such an arrangement may speed the operation of the authorization service 9 and reduce the communications and/or processing burden on other portions of the system 100. For example, SOC, object registration and/or ACE information used by the authorization service 9 may be obtained from the software products 4, e.g., by the authorization service 9 periodically sending a request to each software product 4 to forward the information, or by the authorization service 9 actively capturing the required information from the software products 4. Thus, software products 4 may be arranged to include permission information in a form that can be requested and obtained by the authorization service 9 on a periodic basis, e.g., so that the permission information in the common cache can be updated if some of the permission information for a software product changes. If the authorization service 9 obtains permission information from software products 4, the software products 4 may include an interface (such as a GUI) by which a user may input required information (such as object registration or ACE information), which is then provided to the authorization service 9. Alternately, the authorization service 9 may itself input object registration or ACE information from a user, e.g., via a suitable GUI displayed at the user's computer or other device. The authorization service 9 may also allow a user to de-register one or more objects, delete/modify SOC information, or delete/modify ACE information.

In some embodiments, the new creation of an object by a software product 4 may prompt the software product 4 to automatically register the new object with the authorization service 9, providing an identifier for the object, and the object's type. This, in turn, may prompt the authorization service 9 to request ACE information for the new object, e.g., by providing a message to a user to provide ACE information for the new object as appropriate. Alternately, the authorization service 9 may create default ACE information that at least provides the user that created the object permission to perform suitable actions for the new object.

Similarly, if new software products 4 are added to the system 100, the authorization service 9 and/or the software product 4 may be configured to automatically communicate and share at least SOC information. For example, the authorization system 9 may detect the presence of a new software product (or otherwise be notified of its presence) and take steps to determine if the software product 4 will be a consumer of the authorization service 9. If so, SOC and/or other permission information may be shared as appropriate.

It is not necessary for all software products 4 to be consumers of both an external group service 8 and authorization service 9. Instead, one or more software products 4 may each incorporate an authorization service 9 to perform authorization checks for requested actions based on permission information that is maintained by the software product 4. In this case, the software product 4 may only be a consumer of the group service 8, e.g., obtaining a list of one or more groups to which a user belongs from the group service 8 so that the authorization service 9 in the software product can verify authorization to perform requested actions. However, even in this circumstance, the software product 4 may take advantage of limited scope groups established and maintained for the entire system, including multiple other software products 4.

Figure 5:
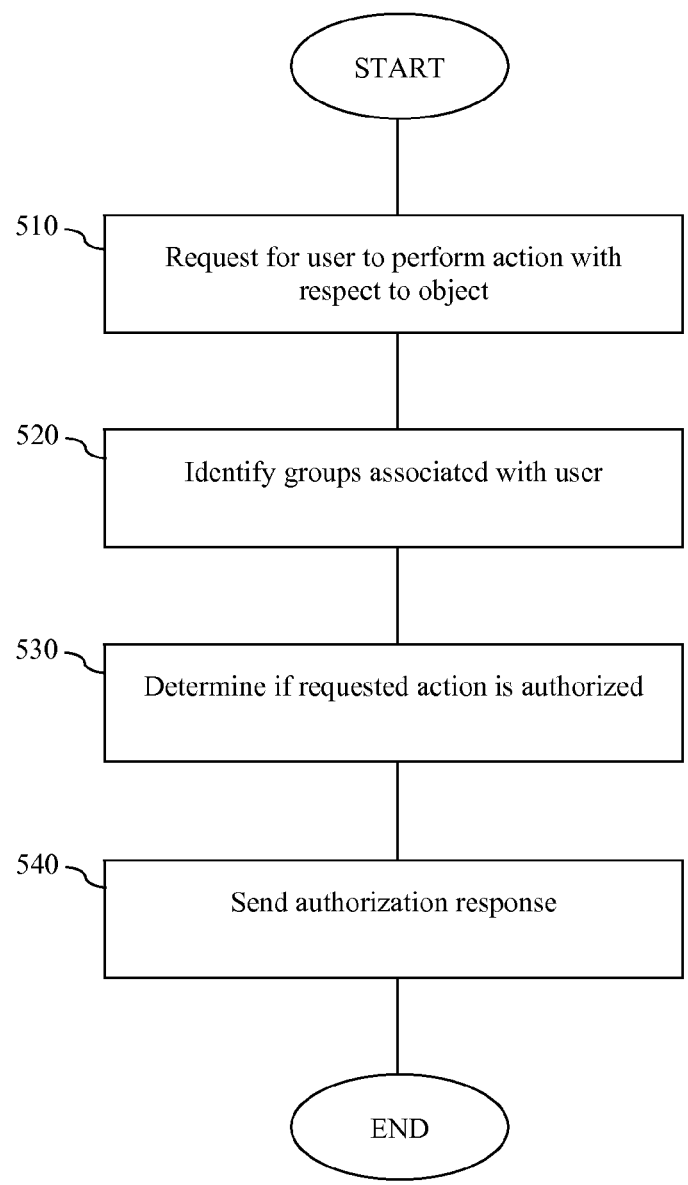
FIG. 5 shows steps in a method for identifying one or more groups for a user and determining authorization for a user to perform a requested action.

FIG. 5 shows a flow chart of a method for handling authorization requests in one illustrative embodiment. In step S10, a request for a user to perform an action with respect to an object is received. Such a request may be sent by a software product 4 to an authorization service 9, and may include information such as the identity of the object, the identity of the user and the action to be performed.

In step S20, a check is made to identify the group(s) with which the identified user is associated. The authorization service 9 may request the group service 8 to provide this information based on the identity of the user. For example, a database of group information may be searched for the user, and the associated groups indicated. Alternately, the authorization service 9 may provide a list of groups (e.g., those groups for which the authorization service 9 has permission information for the identified object) and request that the group service 8 indicate which, if any, of the groups the user is associated with. The groups may be limited scope groups and/or OS/D groups and/or other groups, as appropriate.

In step S30, permission information is checked to determine if the requested action is authorized for the identified user. For example, the authorization service 9 may search permission information for the requested action and object type and determine if the group(s) identified by the group service 8 (or the specific user) is authorized to perform the requested action with respect to the identified object.

Based on the result in step S30, a response to the authorization request is sent. For example, the authorization service 9 may send a message to the requesting software product 4 that the requested action is, or is not, authorized.

In another embodiment, objects may have inheritance relationships with other objects so that the objects share permission information. For example, a new object may be created that is a slightly different version of an earlier object. The new object may have a relationship with the earlier object so that the new object shares the same permission information, e.g., SOC and ACE information. Thus, new permission information need not be created for the new object, but instead only a reference that the new object has the same permission information as the earlier object. Such relationship information can be automatically generated, for example, if an object has no ACE information (e.g., where a user wishes an object to have the same permission information as another object, or as a default where a user forgets or otherwise neglects to provide ACE information). In this case, the object may inherit the ACE information from its nearest ancestor. Inheritance relationships may be indicated in an objects registration record, e.g., by indicating the object's identifier along with a reference to the related object.

The authorization service 9 may also be configured to resolve conflicts between permission information. For example, ACE information for an object may indicate that Group A has no permission to perform a requested action, whereas Group B does have permission to perform the requested action. If the user requesting the action belongs to both Group A and B, the authorization service 9 may resolve the conflict, e.g., by determining that the permission given Group B has a higher priority than the denial of permission to Group A, or vice versa. To resolve such conflicts, individual permission information may be given a priority or weighting that the authorization service may use to reach a resolution. (The priority or weighting information may be stored with the permission information. Alternately, the authorization service 9 may always grant (or deny) permission to perform an action in the case of a direct conflict.

Similar conflict resolution may be performed for inheritance relationships. For example, if a user is denied action on a parent object, but is permitted action on a child object, the authorization service 9 may resolve the conflict. In some cases, there may in fact be no conflict, since, for example, the child may have been suitably altered from the parent to allow the user to perform the desired action. The authorization service 9 may be arranged to detect substantial differences between a parent and child object, or may determine that since the ACE information was specifically entered by a user for the child object, the user is properly permitted the desired action. If, however, the conflict arises from inheritance relationships, e.g., a user indicates that an object is to inherit ACE information for two different objects which have conflicting ACE information, the authorization service 9 may determine that the more restrictive (or less restrictive) permissions should apply to the object. Alternately, the authorization service 9 may use priority or weighting information for the ACE entries to resolve which permission information should control.

While the invention has been described in conjunction with specific embodiments thereof, it is evident that many alternatives, modifications, and variations will be apparent to those skilled in the art. Accordingly, embodiments of the invention as set forth herein are intended to be illustrative, not limiting. Various changes may be made without departing from the spirit and scope of the invention.

The invention claimed is:

1. An apparatus for use in a computer system including a plurality of users and a plurality of software products, including first and second software products, each for performing at least one action with respect to an object, the apparatus comprising:
   a group service having a store of groups that does not include permission information, each group including at least one of the plurality of users; and
   an authorization service, which is separate from the group service, that determines permission for one of the plurality of users to perform a first action using a first software product with respect to a first object based on group information for the one of the plurality of users obtained from the group service and based on corresponding permission information held by the authorization service and stored separately from the store of groups of the group service, and that determines permission for one of the plurality of users to perform a second action using a second software product with respect to a second object, the permission information indicating authorization for at least one group or user to perform at least one action with respect to an object for the plurality of software products;
   wherein the permission information held by the authorization service comprises:
      securable object class information for a plurality of object types that includes a complete set of actions performable with respect to each object type, wherein the securable object class information does not include user information or group information;
      object registration information for a plurality of objects that includes an object identifier and an object type for each object, wherein each object type in the object registration information corresponds to an object type in the securable object class information, and wherein the object registration information does not include user information or group information; and
      authorization entries (ACEs) for the plurality of objects, each authorization entry including an object identifier and a corresponding indication of authorized or unauthorized actions for one or more groups or users to perform with respect to the object, wherein each authorization entry corresponds to an object identifier in the object registration information, and wherein the authorization entries do not determine group membership.

2. The apparatus of claim 1, wherein the permission information is created by a non-systems administrator.

3. The apparatus of claim 1, wherein the permission information is stored in a single location.

4. The apparatus of claim 1, wherein a non-systems administrator controls which users and/or groups correspond to each of the groups.

5. The apparatus of claim 1, wherein the authorization service obtains securable object class (SOC) information from at least one of the plurality of software products.

6. The apparatus of claim 1, wherein the computer system further comprising a store of operating system or directory groups (OS/D groups) that are used by at least one system administrator to control access to certain objects, and wherein at least one group in the store of groups includes at least one OS/D group.

7. The apparatus of claim 1, wherein the authorization service includes inheritance information for two objects that is used to associate permission information for one of the objects in the other object.

8. The apparatus of claim 7, wherein permission information for an object is determined based on permission information for a related object based on inheritance information.

9. The apparatus of claim 1, wherein the authorization service includes:
   a first authorization service that interacts with the first software product and is not configured to interact with the second software product; and
   a second authorization service that interacts with the second software product and is not configured to interact with the first software product.

10. An apparatus for use in a computer system including a plurality of users and a plurality of software products, including first and second software products, each for performing at least one action with respect to an object, the apparatus comprising:
    a group service having a store of groups that does not include permission information, each group including at least one of the plurality of users; and
    an authorization service, which is separate from the group service, that determines permission for at least one user to perform an action with respect to an object based on group information for the at least one user obtained from the group service and based on permission information held by the authorization service and stored separately from the store of groups of the group service, the permission information corresponding to the obtained group information and indicating at least one action that may be performed with respect to an object by at least one group or user;
    wherein the permission information held by the authorization service comprises:
       securable object class information for a plurality of object types that includes a complete set of actions performable with respect to each object type, wherein the securable object class information does not include user information or group information;
       object registration information for a plurality of objects that includes an object identifier and an object type for each object, wherein each object type in the object registration information corresponds to an object type in the securable object class information, and wherein the object registration information does not include user information or group information; and
       authorization entries (ACEs) for the plurality of objects, each authorization entry including an object identifier and a corresponding indication of authorized or unauthorized actions for one or more groups or users to perform with respect to the object, wherein each authorization entry corresponds to an object identifier in the object registration information, and wherein the authorization entries do not determine group membership; and wherein at least one non-system administrator defines at least some of the permission information to assign authorization to one or more groups or users to perform a first action with respect to a first object using a first software product, and wherein at least one non-system administrator assigns authorization to one or more groups or users to perform a second action with respect to a second object using second software product.

11. The apparatus of claim 10, wherein the store of groups includes at least two different group types, a first group type being controlled by a system administrator, a second group type being controlled by a non-system administrator, each group in the second group type including a first type group, a second type group, or a user.

12. The apparatus of claim 10, wherein each of the plurality of software products is arranged to send a request to the authorization service including an identity of a user requesting to perform an identified action with respect to an identified object, and is arranged to perform the identified action upon receiving authorization from the authorization service.

13. The apparatus of claim 10, wherein each of the plurality of software products is arranged to provide permission information to the authorization service including at least one object type and a set of actions that are performable with respect to the object type.

14. The apparatus of claim 10, wherein the authorization service includes a plurality of authorization service modules each operating with a corresponding one of the plurality of software products.

15. A computer-implemented method for operating a computer system, comprising:

receiving a first request regarding a first action requested to be performed by a first user with respect to a first object using a first software product, access to the first object being unrestricted by permissions established by a systems administrator;

obtaining first group information from a group service having a store of groups that does not include permission information, the information indicating that the first user is associated with at least one group;

determining authorization, using a processor of the computer system, for the first user to perform the first action using the first software product based on the first group information obtained from the group service and permission information, which is stored separately from store of groups of the group service, the permission information defining authorization for at least one group to perform at least one action with respect to at least one object; wherein the permission information comprises:

securable object class information for a plurality of object types that includes a complete set of actions performable with respect to each object type, and wherein the securable object class information does not include user information or group information;

object registration information for a plurality of objects that includes an object identifier and an object type for each object, wherein each object type in the object registration information corresponds to an object type in the securable object class information, and wherein the object registration information does not include user information or group information; and authorization entries (ACEs) for the plurality of objects, each authorization entry including an object identifier and a corresponding indication of authorized or unauthorized actions for one or more groups or users to perform with respect to the object, and wherein each authorization entry corresponds to an object identifier in the object registration information;

receiving a second request regarding a second action requested to be performed by a second user with respect to a second object using a second software product, access to the second object being unrestricted by permissions established by a systems administrator;

obtaining second group information from the group service indicating that the second user is associated with at least one group; and determining authorization, using the processor of the computer system, for the second user to perform the second action using the second software product based on the obtained second group information and the permission information.

16. The method of claim 15, wherein the first and second requests are sent by the first and second software products, respectively.

17. The method of claim 15, wherein a set of users or groups that correspond to at least one group is controlled by a user with less than system administrator privileges.

18. The method of claim 15, wherein the at least one group includes a group that is controlled by a system administrator.

* * * * *